United States Patent [19]
John, Jr.

[11] 3,836,248
[45] Sept. 17, 1974

[54] OPTICAL DOCUMENT SENSOR FOR READING MACHINES

[75] Inventor: Robert Sawyer John, Jr., Deerfield, Ill.

[73] Assignee: Bell & Howell Company, Chicago, Ill.

[22] Filed: May 18, 1973

[21] Appl. No.: 361,732

[52] U.S. Cl................ 355/50, 250/210, 250/219 R, 355/64, 355/68
[51] Int. Cl.... G03b 27/74, G03b 27/48, H01j 39/12
[58] Field of Search.............. 355/64, 68, 14, 8, 50, 355/51; 250/219 R, 210, 220 R

[56] References Cited
UNITED STATES PATENTS 3,615,133  10/1971  Fairbanks et al. ............... 355/64 X
3,709,604  1/1973  Niesen et al. ........................ 355/64

*Primary Examiner*—Richard A. Wintercorn
*Attorney, Agent, or Firm*—Robert A. Walsh; Gerald B. Epstein

[57] ABSTRACT

An optical sensor head has a plurality of photocell sensors connected in a bridge circuit. The sensor in one arm of the bridge reads light transmitted directly from a source. At least one sensor in another arm of the bridge reads light transmitted from a source through a document reading area. If a document is present, it affects the light being transmitted to the photocell sensors sufficiently to unbalance the bridge. As a result, the potential differences across the bridge circuit are able to reliably detect the most translucent paper likely to be encountered in the described reading process.

11 Claims, 5 Drawing Figures

OPTICAL DOCUMENT SENSOR FOR READING MACHINES

This invention relates to sensors and, more particularly, to means for sensing the presence of documents — expecially, although not exclusively, in microfilm copy machines, such as machines for making reduced-size microfilm copies of various documents.

Microfilm copy machines are adapted to copy documents on more or less an automatic basis. In order to do this, it is necessary for the photocopy machine to detect the presence of a document in the general area which, defin the photographic station, during the microfilming process. Detection has been made by means of mechanical feelers, fingers, or the like. However, such mechanical members are in certain instances susceptible to jamming and may damage or deface the documents.

To avoid such problems, various methods have been adopted using optical readers to detect the presence of documents at the photographic station. One method entails light reflected from the photographic station. However, this method is not completely satisfactory since reflection levels may not vary sufficiently responsive to the presence or absence of documents. Another document sensing method involves interposing a document between a source of light and a light sensor. However, this method is not completely satisfactory. For example, some onion skin paper is so highly transmissive to light that more than two-thirds of the light passes through the paper and reaches the light sensor. However, lamp aging and supply voltage variations alone can cause the light source output to vary by more than three to one so that the presence of such thin paper cannot be detected reliably. In addition, for various film speeds and for different document colors, it may be necessary to vary the applied lamp voltage over nearly a two to one range, for proper microfilm imaging. The resulting range of illuminance to be sensed by the photosensors far exceeds the transmission differences for, say, onionskin paper.

Accordingly, an object of this invention is to provide new and improved optical sensors. Here, an object is to provide optical sensors for all forms of nontransparent documents without regard to their reflective, translucent, or opaque qualities. In particular, an object is to provide means for reliably detecting the presence of the most translucent paper likely to be encountered by a microfilming machine.

Another object of the invention is to provide new and improved document photographing machines. In this connection, an object is to provide such machines with jam-proof document sensors. A more particular object is to provide such machines with sensors which do not mar or deface documents.

Yet another object is to provide new and improved methods and processes for photographically copying documents. Here, an object is to provide controls for carrying out such methods and processes. In particular, an object is to provide sensors for use in control systems for such methods and processes.

In keeping with an aspect of this invention, these and other objects are accomplished by means of an optical sensor head having a plurality of photocell sensors connected in a bridge circuit. The sensor in one arm of the bridge reads light transmitted directly from a source. At least one sensor in another arm of the bridge reads light transmitted from a source through a document area. If any document is present, it affects the light being transmitted through the document area sufficiently to unbalance the bridge. As a result, the bridge circuit is able to reliably detect the most translucent paper likely to be encountered in the described photographic process.

The nature of a preferred embodiment for accomplishing these objects will become more apparent from a study of the following specification in conjunction with the attached drawings wherein.

Figure 1:
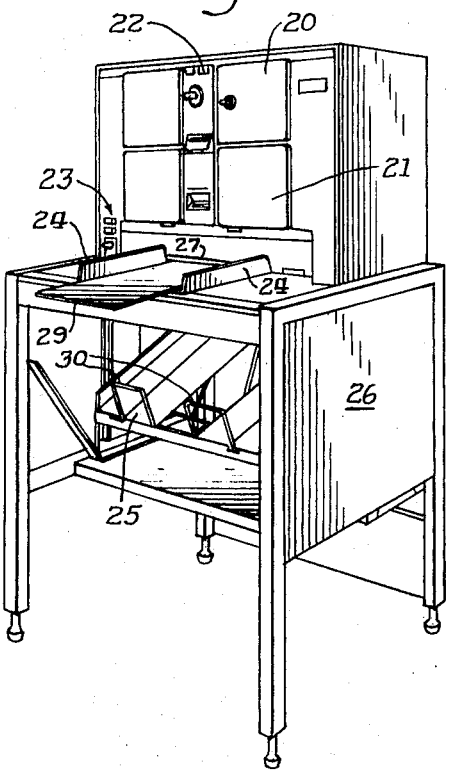
FIG. 1 is a perspective view which schematically shows a typical photographic copy machine — here a microfilm copy machine.

In greater detail, FIG. 1 shows an exemplary microfilm recorder of a type which might employ the inventive optical sensor. The major sub-assemblies of this recorder are a camera 20, a film supply 21, suitable controls 22, lamp indicators 23, document input guide members 24, and a document output stacker 25, mounted in and supported by a suitable housing and stand 26.

The camera is properly adjusted. Then a document 29 is fed into the recorder via the guide members 24 and a slot 27 of suitable width, such as ten to twenty inches. The documents and film are fed at synchronized speeds through the machine by suitable internal transport mechanisms. Thus, the length of the microfilm supply is the only constraint upon the length of a document which may be fed through the microfilm reader. The documents are delivered out of the bottom of the machine. Since these documents are usually of discrete page length they may be stacked in suitable guides 30 at the lower end of output stocker 25. If longer, they may simply be pulled up over the guides 30 and into any suitable receptacle.

Figure 2:
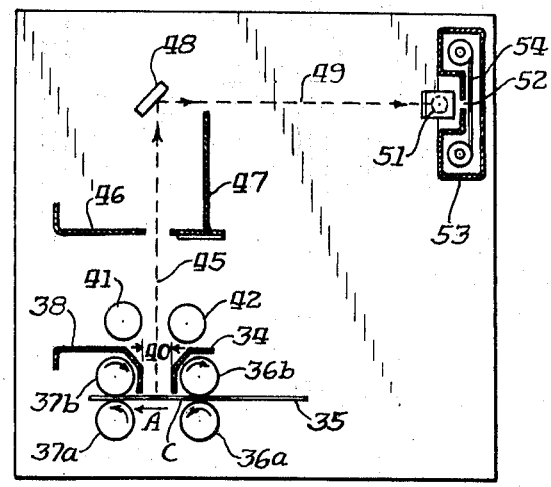
FIG. 2 is a schematic disclosure of an optical path used in the machine of FIG. 1.

As the documents feed through the microfilm reader, they pass a reading or recording area wherein any image on them is transmitted over an optical path shown in FIG. 2. In greater detail, the documents pass through a series of pressure rollers 36a, 36b, and 37a, 37b, which tend to pinch the document and to push it forward in direction A. As the document moves forward, it passes under aperture plates 38, 39 which conceal all of the document except for that exposed in an aperture or a reading format area 40 extending across the full width of the document. Lamps 41, 42 (preferably tubular lamps) extend across the full width of the documents to light the aperture or reading format area 40.

Reflections of light from the document in area 40 travel over an optical path 45 through an upper aperture in upper baffle plates 46, 47. These plates block out all light except for the document image. Any suitable reflecting means, such as aperture mirror 48 guide and direct the reflected light through a lens system 51 and a film aperture 52 in a cassette or other housing 53. Any suitable means (not shown) drives a film strip 54 past the aperture 52 at the same speed that the document 35 moves as it is transported across the lower aperture or reading format area 40. Therefore, a clear image is recorded on the film 54.

Figure 3:
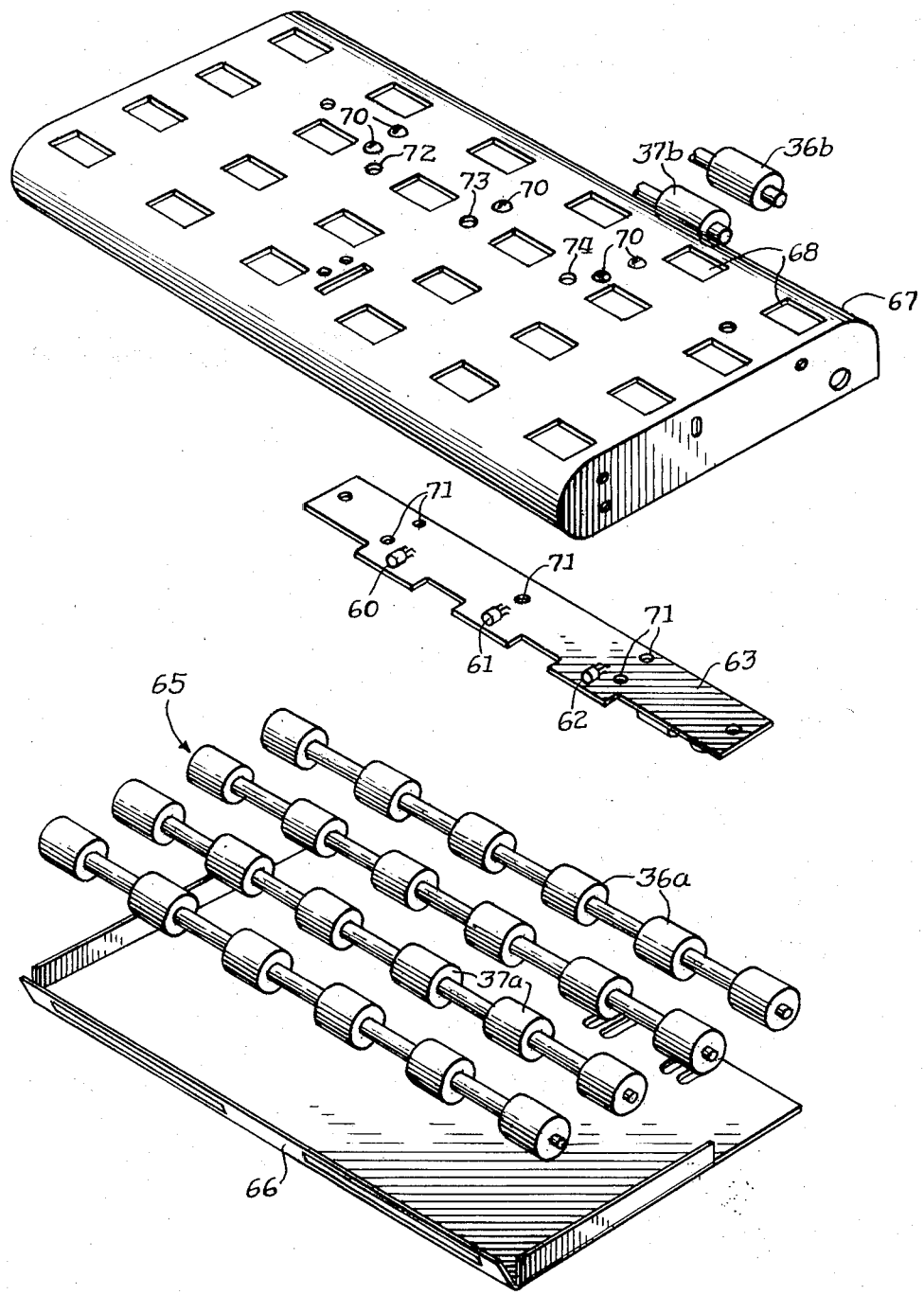
FIG. 3 is an exploded view of the mechanism used to feed documents through the machine of FIG. 1.

Means are provided for optically detecting documents passing through the lower aperture or reading format area. In greater detail, any suitable member of optical sensors 60, 61, 62 may be utilized, comprising photoresponsive transistors, photocells, etc., and as shown in FIG. 3 may be mounted on a printed circuit card 63, and positioned adjacent document feed rollers. In this particular case, three sensors are used so that narrow documents may be detected, regardless of their lateral alignment in the document passageway. If still narrower documents must be detected or if wider document passageways are used, more sensors may be provided.

The manner of mounting these sensors should become more apparent from a study of FIG. 3. In greater detail, a suitable number of pressure rollers 65 are mounted in any suitable manner in a spaced parallel relationship within an enclosure formed by a supporting plate 66 and a covering shell 67. A number of apertures 68 are formed in the shell 67 so that each pressure roller may project upwardly through the shell. The document rides on the rollers 65, thus peeping up through the apertures 68. Another somewhat similar, but inverted, unit is positioned above the shell 67, as viewed in FIG. 3, with similar rollers in mating position above rollers 65.

Documents thus pass between the upper and lower rollers. This relationship should become clear by noting and comparing the positions of rollers 36, 37 in FIGS. 2 and 3. Hence, the document 35 passes above shell 67 and below a similar and inverted shell (not shown) for supporting the rollers 36b, 37b.

Suitable bolts or screws 70 pass through holes 71 in the printed circuit card 63 to secure it to shell 67. Holes 72, 73, 74 are formed in the shell 67, immediately above the optical sensors 60, 61, 62. These holes and sensors are immediately in front (with respect to document travel) of the lower aperture or reading area 40. Thus, the sensors are in approximately the position indicated by arrow C in FIG. 2.

From a study of FIG. 2, it should be apparent that the document cuts a beam of light passing from lamp 42 through holes 72-74 to photocells 60-62. Also, since there is a fixed time required for the document to travel from position C to the lower aperture 40, the control system may be easily adapted to synchronize the microfilming of the document.

Figure 4:
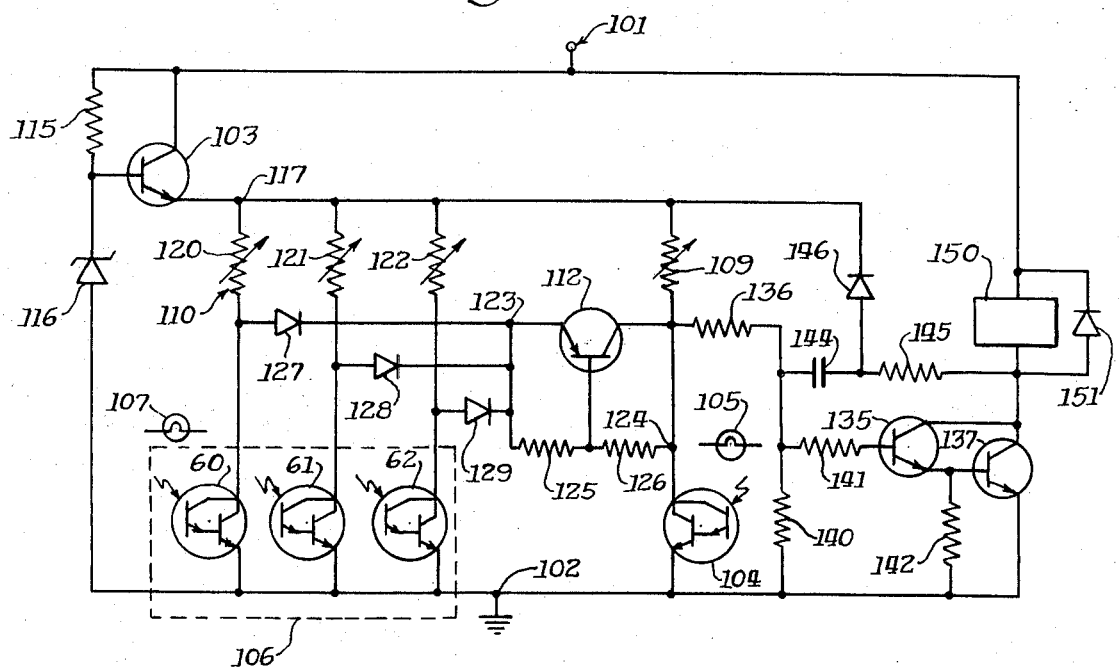
FIG. 4 is a schematic circuit diagram of a preferred optical sensor circuit for use in the machine of FIG. 1.
Figure 5:
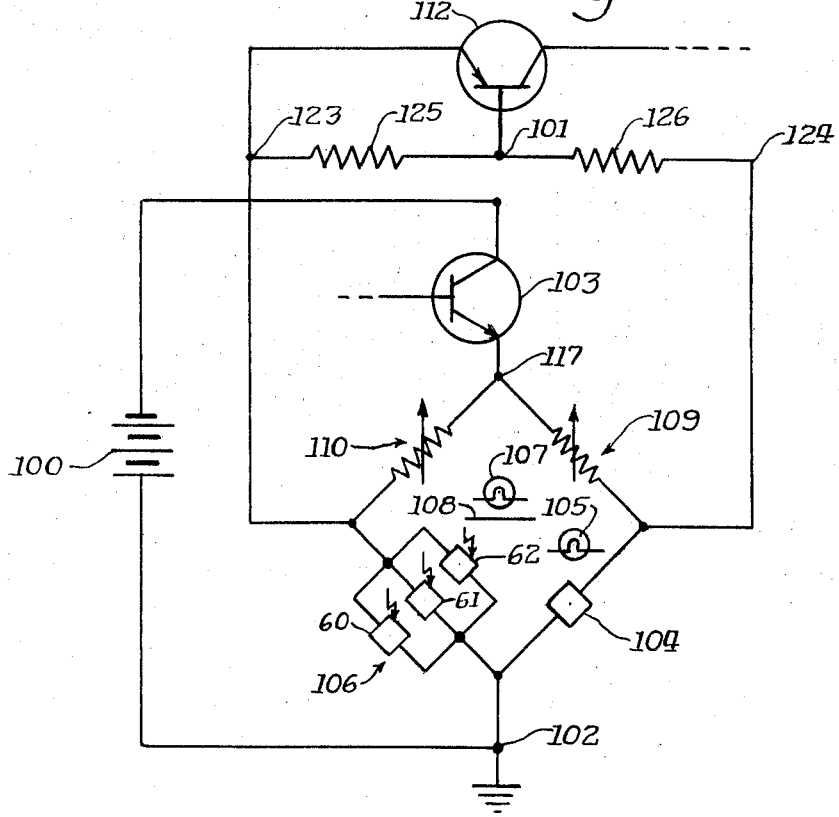
FIG. 5 is a simplified bridge circuit showing elements selectively taken from the circuit diagram of FIG. 4.

FIG. 4 is a schematic circuit diagram showing an embodiment of the inventive circuit and FIG. 5 includes selected parts taken therefrom. FIG. 5 is drawn in a diamond bridge configuration so that the nature of the invention may become more apparent. It may be convenient hereinafter to refer to these two figures interchangeably.

A battery or other voltage source 100 is coupled across points 101, 102 of the bridge circuit via an electronic voltage regulator 103. One active arm of the bridge comprises a light responsive device 104 which receives light directly from a suitable source 105. The other active arm of the bridge comprises a plurality of parallel-connected light-responsive devices 106 (photocells 60, 61, 62) that receive light from a source 107 (preferably document illumination lamps 41, 42). The light falling on devices 106 may be interrupted when a document 108 is present in the lower aperture or reading format area 40. The passive arms of the bridge comprise variable resistors 109, 110.

In greater detail, the electronic voltage regulator 103 comprises a NPN transistor having its collector connected to the negative potential of the battery 100 and its emitter collected to the top of the bridge. The base of transistor 103 is connected to a voltage-dividing circuit comprising a resistor 115 and a Zener diode 116 connected across battery 100. Resistor 115 supplies a maintenance current to the Zener diode 116 and transistor 103. The transistor 103 maintains a voltage at node 117 which is stabilized by the breakdown voltage of the Zener diode.

The three optical sensors may be any suitable devices. However, they are here shown as paired light-sensitive transistors connected in Darlington configurations. Each Darlington pair is individually biased by its individually-associated resistor 120, 121, 122 respectively. Therefore, each Darlington pair may be individually biased to provide three equally biased paths. This is important in order to avoid a runaway condition whereby one of the parallel paths begins to draw current out of the other two parallel paths.

The other side of the bridge circuit comprises a similar pair of photosensitive transistors 104, also connected in Darlington configuration. This transistor pair is independently illuminated by irradiance from lamp 105. Therefore, the light falling on the photosensitive transistors 104 is not affected by the presence or absence of a document. However, if both lights 105, 107 are in fact the light in the lower aperture or reading format area 40, both sides of the bridge will vary together and thereby avoid light fluctuations. It has been found that light output variations of at least seven to one, due to lamp voltage variation, can be accomodated employing a system in accordance with the present invention.

The base bias for a differential amplifier 12, in the form of a PNP transistor, is supplied by a voltage divider 125, 126 connected across normally equipotential points 123, 124 on the bridge. The connections from the parallel diodes 60-62 are made to the emitter of transistor 112 via isolating diodes 127-129, to preclude interaction between three parallel paths. Therefore, the base of the transistor receives a biasing potential reflecting the balanced condition of the bridge circuit.

When no document is present in the area 40, points 123, 124 are, in fact, at equal potential and the base of the differential amplifier 112 receives no bias potential. If a document is present, less or no light reaches one or more of the photosensitive transistors 60-62. Therefore, the bridge is unbalanced and points 123, 124 are at different potentials. Responsive thereto, a voltage is divided by the resistors 125, 126 to bias the transistor 112 to an "on" condition. Responsive thereto, current flows through the emitter-collector circuit of the transistor 112. The positions and viewing angles of the lamps and photosensitive transistors 60-62 are preferably selected to insure no response in transistor 112 when no document is present and to insure a response in transistor 112 when a document is at any light-interrupting position in the area 40.

The collector of the transistor 112 is coupled to a driver stage 135 via a coupling and current-limiting resistor 136 for controlling the reading machine in any suitable manner. In greater detail, the driver stage 135 comprises a pair of NPN transistors couples in a Darlington configuration to provide driving current. The Darlington circuit is used because it has sufficient excess current gain to cause positive switching. The remaining components in the driver stage are a resistor 140 which cooperates with the resistor 136 to form a base-biasing voltage divider, a resistor 141 which limits current, an emitter supply resistor 142 which provides temperature stability, and an RC timing network 144, 145. A diode 146 provides a low impedance return path for the capacitor 144 in order to stabilize the voltage at the junction of resistors 136, 140, 141 during the capacitor discharge time. This stability insures that the Darlington transistors will remain in saturation while they are switched on.

The circuit operates as follows. Normally, when no documents are present in the format reading area, all photosensitive transistors are illuminated and the bridge is in balance. There is no appreciable potential difference between voltage points 123, 124. The differential amplifier transistor 112 is switched off, and no control current reaches the driver 135.

When a document is inserted in the sensing area, it interrupts or decreases the light and reduces the illumination on at least one of the three lower sensors. The interrupted or decreased light reduces the sensor current through the photosensitive transistor. The potential difference across the points 123, 124 diverts current into the comparator stage 112. This stage then increases the input current to the driver stages 137 via the resistor network 136, 140 and 141. When a sufficient voltage and current is impressed onto the input of the first Darlington transistor, it conducts current heavily enough to saturate the second Darlington transistor, thus applying power to a load 150 via a conductive path extending from potential point 101 to potential point 102.

After the document passes, full light returns to the photosensors 60, 61. However, the signal supplied to the input of stage 137 is maintained for a short time delay period measured by the RC network 144-146. This delay allows enough time for completion of the entire recording process. Diode 151 bypasses inductive transient voltages, produced by the switching of voltage across the load.

Thereafter, stage 137 switches off, deactuating the load 150. While the load 150 may represent any suitable work device, it is typically a film drive clutch and a solenoid-actuated shutter mechanism.

Because of the nature of the properly aligned bridge circuit, the above sequence of operations occurs consistently over a wide range of voltages. For example, the line voltage applied to the lamps may vary in a range of about 65 to 135 volts at 60 Hz. Since the bridge is reliable across a range of about eleven to one in radiance, the circuit reliably detects the thinnest onionskin likely to be encountered.

Those who are skilled in the art will readily perceive alternatives and modifications; therefore, the appended Claims are to be construed to cover all equivalent structures falling within the scope and spirit of the invention.

What is claimed is:

1. An optical sensor system comprising a plurality of photo sensor means connected in a bridge circuit, means for exposing a sensor means in one arm of the bridge responsive to light transmitted directly from a light source, at least one sensor means in another arm of the bridge positioned to read light transmitted from a source through a document-receiving area, whereby any document present in the area sufficiently affects the amount of light transmitted to the sensors in the receiving area to unbalance the bridge, means responsive to the unbalanced bridge for performing a work function, means for mounting the sensor means in a microfilm copy machine, and means for actuating the microfilm copy machine to copy documents on an automatic basis responsive to the detection by said bridge circuit of the presence of a document in the general area which is photographed during the microfilm process.

2. The system of claim 1 wherein said light source is on one side of said document and said photo sensors are on the other side of said document, whereby sensed documents interposed between the source of light and sensor means function to interrupt or reduce light falling on said sensor.

3. An optical sensor system comprising a plurality of photo sensor means connected in a bridge circuit, means for exposing a sensor means in one arm of the bridge responsive to light transmitted directly from a light source, at least one sensor means in another arm of the bridge positioned to read light transmitted from a source through a document-receiving area, whereby any document present in the area sufficiently affects the amount of light transmitted to the sensors in the receiving area to unbalance the bridge, and means responsive to the unbalanced bridge for performing a work function, wherein said photo sensors comprise means for optically detecting documents passing through a reading format area, there being a suitable number of the photo sensors mounted longitudinally across the width of the document feed passage so that narrow documents may be detected regardless of their lateral alignment in the document passage.

4. The system of claim 3 and providing a suitable number of pressure roller means mounted in spaced parallel relationship within an enclosure formed by a supporting plate and a covering shell, a plurality of apertures are formed in the enclosure so that each pressure roller may project through the enclosure, the document riding on the rollers thus peeping up through the apertures, formed in the enclosure immediately above the photo sensors, these holes and sensors being in front, with respect to document travel, of the reading format area, whereby a document riding on the rollers cuts a beam of light passing from the format area through the holes to the photo sensors.

5. An optical sensor system comprising a plurality of photo sensor means connected in a bridge circuit, means for exposing a sensor means in one arm of the bridge responsive to light transmitted directly from a light source, at least one sensor means in another arm of the bridge positioned to read light transmitted from a source through a document-receiving area, whereby any document present in the area sufficiently affects the amount of light transmitted to the sensors in the receiving area to unbalance the bridge, and means responsive to the unbalanced bridge for performing a work function, wherein said bridge has a diamond configuration, voltage source means being coupled across opposite points of the diamond configuration via an electronic voltage regulator, the other arm of the bridge comprising a plurality of sensors in the form of parallelconnected light-responsive devices that receive light from a document illumination light source, the light falling on the devices being interrupted when a document is present in the document receiving area.

6. The system of claim 5 wherein each of the sensor means comprises paired light-sensitive transistors connected in Darlington configurations, each Darlington pair being individually biased by an individually-associated resistor to provide equally biased parallel paths.

7. The system of claim 6 and differential amplifier means supplied by a voltage divider connected across normally equipotential points on the diamond bridge configuration whereby said differential amplifier normally receives a biasing potential reflecting a balanced condition of the bridge circuit when no document is present in the document-receiving area, and reflecting an unbalanced condition when a document is present in the area.

8. A document photographing machine comprising non-contacting jamproof document sensor means coupled in a bridge configuration, means for operating sensors on one side of the bridge in an environment which is unaffected by the presence or absence of a document, means for operating sensors on another side of said bridge in an environment which is affected by the presence or absence of a document, and means responsive to an unbalance of said bridge for causing said machine to undertake a work cycle, wherein there is a camera, a film supply and transport means, control means, and a path for transporting document through said machine, said path comprising document input guide members, and document output stacker means mounted in and supported by a housing and stand means.

9. The machine of claim 8 and means for transmitting documents and film through said machine at synchronized speeds, whereby the length of the microfilm supply is the only constraint upon the length of a document which may be fed through the microfilm reader.

10. The machine of claim 8 and means for transporting documents over said path through the machine, said document transport path including a reading format area, optical path means for transmitting any image in the format area over the optical path to said film.

11. The machine of claim 10 wherein said document path comprises aperture plate means which conceal all of the document except for that exposed in the reading format area, said area extending across the full width of the document, means for supplying light uniformly across the full width of the documents to light the reading format area, reflections of said light from the document in the format area traveling over said optical path extending through an aperture in baffle plates which block out all light except for the document image, said document sensor means in the other side of the bridge being positioned to read the light from the means supplying said format area.

* * * * *